Figure 1:
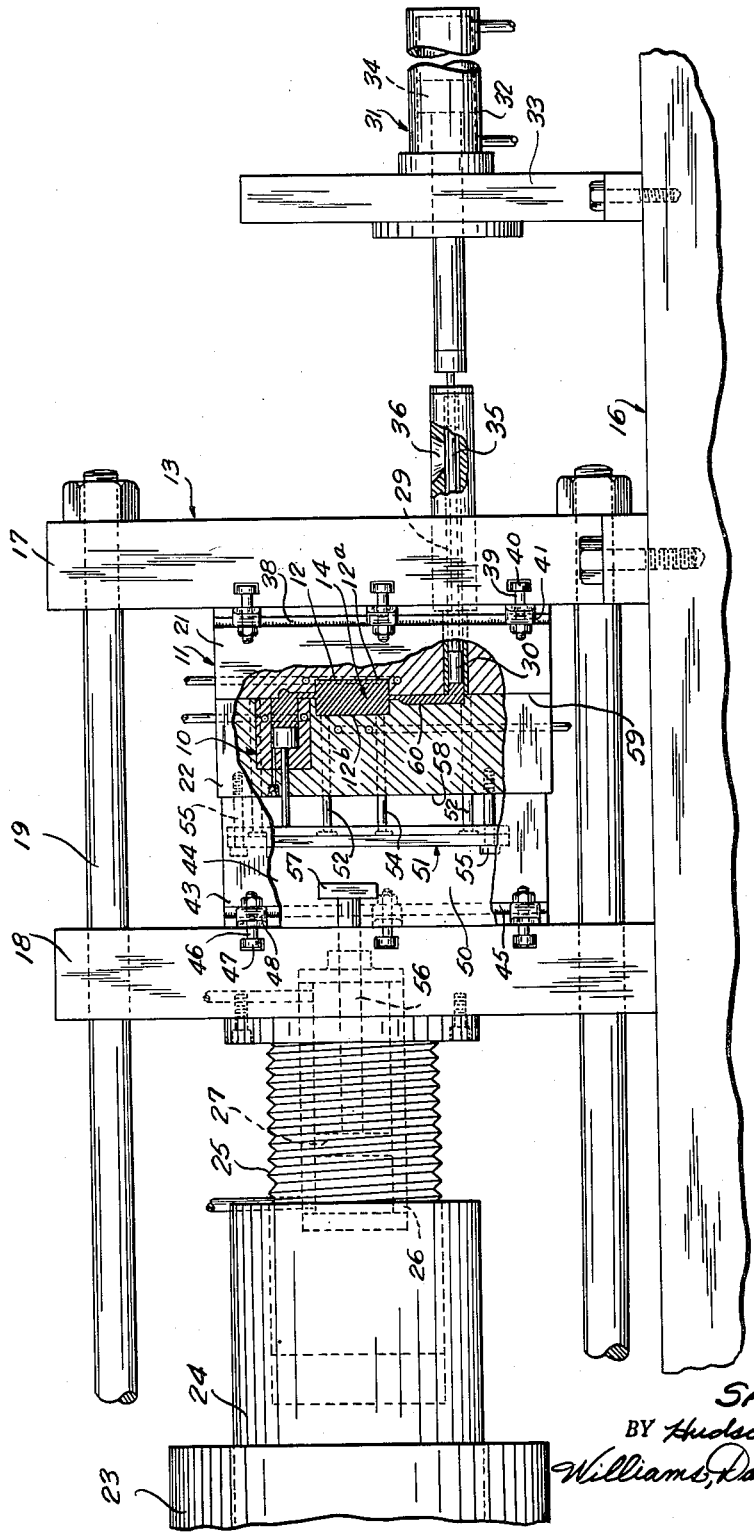

March 28, 1961  S. J. FOTI  2,976,568
MOLD CAVITY VENTING DEVICE
Filed March 18, 1959  3 Sheets-Sheet 1

INVENTOR.
SAM J. FOTI
BY Hudson, Boughton,
Williams, David & Hoffmann
ATTORNEYS

March 28, 1961 S. J. FOTI 2,976,568
MOLD CAVITY VENTING DEVICE
Filed March 18, 1959 3 Sheets-Sheet 3

INVENTOR.
SAM J. FOTI
BY Hudson, Boughton,
Williams, David & Hoffmann
ATTORNEYS

United States Patent Office 2,976,568
Patented Mar. 28, 1961

2,976,568
MOLD CAVITY VENTING DEVICE
Sam J. Foti, Warrensville Heights, Ohio, assignor to The Auto-Diesel Piston Ring Company, Cleveland, Ohio, a corporation of Ohio
Filed Mar. 18, 1959, Ser. No. 800,205
1 Claim. (Cl. 18—30)

This invention relates to molding apparatus and, more particularly, to means for ridding a mold cavity of air and gas to thereby prevent damaging effects of such air or gas on the article or casting being molded.

It is well known that the presence of air and evolved gas in a mold cavity during a molding operation is harmful and tends to produce bubble holes and other irregularities and blemishes in or on the article being molded, and that this difficulty is especially troublesome in die casting procedures and the like wherein metal or plastic articles are produced by the injection of fluid molding material into the die cavity in a heated condition and under pressure.

Attempts have been made to get rid of such air or gas by providing the mold with a restricted relief opening or a vent passage to atmosphere but such restricted openings and vent passages are subject to clogging, either by some of the molding material flowing thereinto or by deposits of foreign matter such as carbon occurring therein. Frequent applications of oil and the like are made to the mold members during die casting operations and such oil, becoming heated, tends to produce the carbon deposits as well as evolved gas.

The occurrence of such clogged conditions for the relief openings and vent passages heretofore provided has prevented the achievement of a successful and reliable removal of air and gas from the mold cavity, and moreover, the entry and solidification of molding material in such relief openings and vent passages has resulted in a further troublesome complication. When the clogged conditions occur, the molding machines involved are frequently rendered idle and the resulting interruptions in production are very costly as well as the labor expense required to restore the molds to proper operating condition.

As one of its objects, this invention accordingly contemplates novel molding apparatus having means providing a displacement space or chamber for receiving air and the like from the mold cavity during a molding operation, and means movable in one direction in such space by the cavity-displaced air and subsequently movable in the opposite direction for clearing the space.

Another object is to provide novel air removal means for a mold cavity comprising a valve chamber communicating with the cavity for receiving air therefrom, and a valve member operable in the chamber by the displacement movement of such air.

A further object is to provide molding apparatus and air removal means therefor of the character referred to above wherein the displacement space or chamber is a cylinder and the means movable therein is a plunger or the like, the cylinder preferably having an open end presented toward or lying in the parting plane of the mold and the plunger being movable in a direction away from such open end by the action of the displaced air thereagainst and returnable to such open end for clearing the cylinder.

Figure 2:
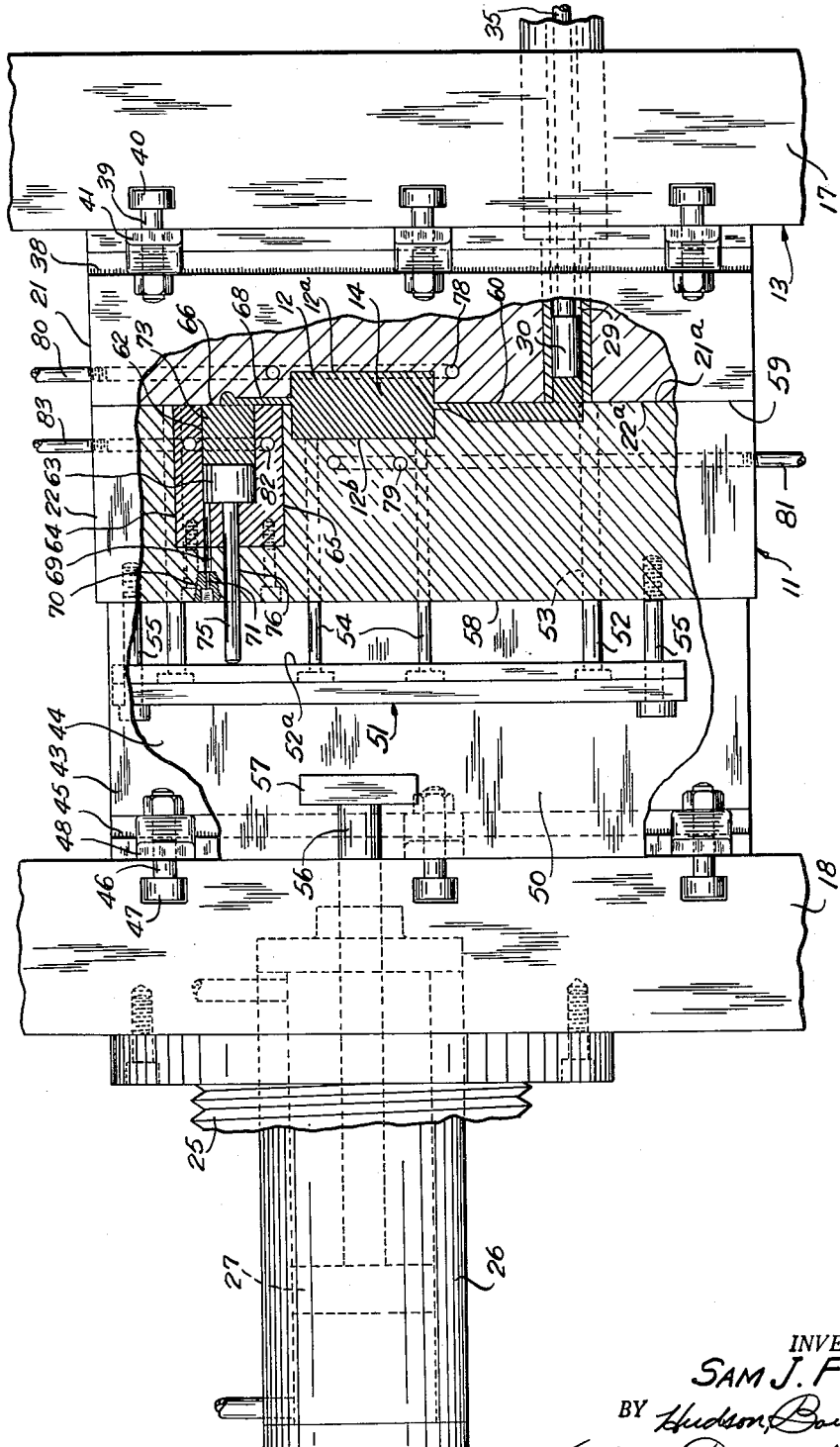
Figure 3:
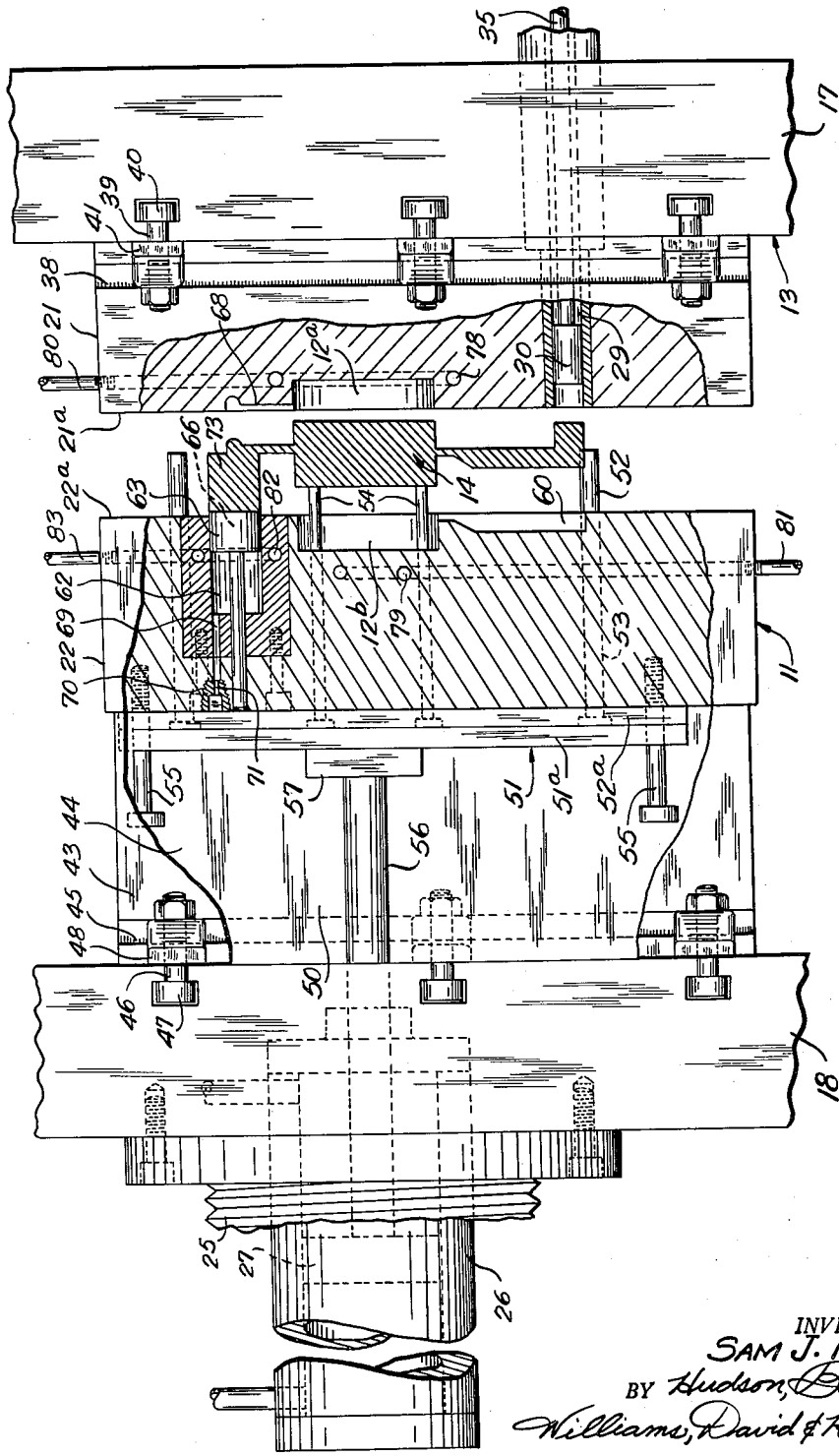

Other objects and advantages of this invention will be apparent in the following detailed description and in the accompanying drawings forming a part of this specification and in which, Fig. 1 is a longitudinal vertical section taken through molding apparatus embodying this invention;

Fig. 2 is a partial longitudinal vertical section on a larger scale and corresponding with a portion of Fig. 1; and Fig. 3 is a partial longitudinal vertical section similar to that of Fig. 2 but showing the mold in its open condition.

The accompanying drawings show the venting device 10 of this invention applied to a mold 11 for ridding the mold cavity 12 of ventable fluid comprising air and gas and is shown, by way of example, as being used in a molding machine 13 of the pressure injection type. The machine 13 is here shown as being a conventional diecasting machine and the article 14 being formed in the mold 11 is a metal article, although the venting device 10 is applicable to various kinds of molds and molding equipment including those used in the production of articles from plastic or composite materials.

The molding machine 13 is here shown as having a frame structure 16 and co-operating stationary and movable platens 17 and 18. The stationary platen 17 is connected with other portions of the machine by suitable tie rods 19 which also form guide members along which the movable platen 18 is movable. The mold 11 comprises co-operating stationary and movable mold members 21 and 22 which are connected respectively with the stationary and movable platens 17 and 18.

The molding machine 13 is also provided with a main hydraulic actuating cylinder 23 for causing opening and closing of the mold 11 and which cylinder is a doubleacting cylinder and is provided with a reciprocable piston or ram 24. The movable platen 18 is connected with the ram 24 by a threaded stem 25 providing for adjustment of the length of the connection between these members. The threaded stem 25 contains an auxiliary doubleacting hydraulic cylinder 26 having a piston 27 reciprocable therein and which auxiliary cylinder serves as an ejector or knock-out cylinder.

Molding material is supplied to the cavity 12 of the mold 11 in a fluid form and usually in a heated condition and under pressure. For this purpose the machine 13 is provided with an injection cylinder 29 having an injection plunger 30 reciprocably movable therein and actuated by a second auxiliary hydraulic cylinder device 31. The auxiliary cylinder device 31 comprises a cylinder 32 suitably supported by a bracket portion 33 of the frame 16 and a piston 34 reciprocable in the cylinder and connected with the injection plunger 30 by a piston rod 35. The fluid molding material is supplied to the injection cylinder 29 through a receiving port 36, while the plunger 30 is in a retracted position, after which the plunger is actuated in a forward direction by the cylinder device 31 to rapidly inject the molding material into the mold cavity 12.

The stationary mold member 21 forms the cover portion of the mold 11 and may contain a portion 12ª of the die cavity 12 which registers with a cavity portion 12ᵇ formed in the movable mold member 22 when the latter is in its closed position, as shown in Figs. 1 and 2. The mold member 21 is here shown as being provided on opposite sides thereof and adjacent the rear edges thereof with vertical slots 38 and is connected with the stationary platen 17 by means of clamping bolts 39. The bolts 39 have the heads thereof located in T-slots 40 of the stationary platen 17 and extend through suitable clamping lugs or clips 41 which engage in the slots 30.

The movable mold member 22 is provided with a pair of upright parallel arms 43 and 44 extending rearwardly therefrom in a laterally spaced relation and which arms are provided in their outer faces with vertical slots 45 adjacent their rear edges. The mold member 22 is carried by the movable platen 18 by the attachment of the arms 43 and 44 thereto, as by means of connecting bolts 46 having their heads engaged in T-slots 47 of the movable platen. These bolts extend through suitable lugs or clips 48 which are engaged in the vertical slots 45. The spaced arms 43 and 44 thus provide therebetween a recess or chamber 50 at the rear of the mold member 22 and in which an ejector member 51 is movable.

The ejector member 51 is a plate-like structure supported for limited movement relative to the mold member 22, as by means of support rods 52 slidably operable in passages 53 of this mold member. The ejector member 51 also comprises suitable knockout pins 54 which are slidably operable in the mold member 22 for engagement of their free ends with the article or casting 14 for ejecting the latter from the mold cavity 12 when the mold 11 has been opened to the condition shown in Fig. 3. The ejector member 51 is preferably formed by connected plates 51ᵃ and 52ᵃ and the guide rods and knock-out pins 52 and 54 are connected with the ejector member by having their heads located between the connected plates.

The piston 27 of the ejector cylinder 26 includes a piston rod 56 which extends through the movable platen 18 and is provided with a head 57 located in the recess 50 and engageable with the ejector member 51. When the movable mold member 22 is in its closed position shown in Figs. 1 and 2, the ejector member 51 is in a spaced relation to the rear face 58 of this mold member and, at this time, the support rods 52 and the knock-out pins 54 are in a retracted position. Screws or studs 55 secured to the mold member 22 extend through the ejector member 51 and have heads engageable by the latter. The studs 55 are commonly referred to as stripper bolts and limit the extent of the movement of the ejector member in a direction away from the mold member 22.

As the mold member 22 is moved to its open position shown in Fig. 3 after the article 14 has been formed in the mold cavity 12, the space between the ejector member 51 and the head 57 is taken up by the engagement of the ejector member with the latter. The ejector cylinder 26 is then supplied with motive fluid to cause the head 57 to move the ejector plate toward and against the rear face 58 of the mold member 22 thereby ejecting the article 14 from the mold cavity 12, as shown in Fig. 3, so that the article can drop out between the spaced-apart mold members 21 and 22. During the reclosing of the mold 11, the support rods 52 act as push-rods for moving the ejector member 51 back to its spaced position relative to the rear face of the mold member 22 to thereby retract the ejector pins 54 from the mold cavity 12.

The mold members 21 and 22 have a parting line or plane 59 between their adjacent or co-operating faces 21ᵃ and 22ᵃ and the injector cylinder 29 extends through the stationary platen 17 and the mold member 21 so that the open inner end of this cylinder lies in or adjacent the parting plane. The inner end of the injector cylinder 29 is connected with the mold cavity 12 at one side of the latter, in this case the lower side, by a runner passage 60 formed in the movable mold member 22. When the molding material is injected into the mold 11 by the plunger 30, the material flows rapidly through the passage 60 and upwardly into the mold cavity 12 to fill the same.

The venting device 10 is shown in the drawings as being associated with one of the mold members, in this case the movable mold member 22, and is located in this mold member in an adjacent relation to the cavity 12. This venting device is an expansible-chamber type of device and comprises a displacement space or valve chamber 62, which is preferably in the form of a bore or cylinder, and a movable member 63 in such space or cylinder and being preferably in the form of a valve member or plunger. The cylinder 62 can be formed directly in the mold member 22 but is preferably formed in an adapter member or body 64 which is in the form of a block seated in a recess 65 provided in this mold member.

The venting device 10 is so located in the mold member 22 that the open end 66 of the cylinder 62 lies in or adjacent the face 22ᵃ of this mold member, that is to say, in or adjacent the parting plane 59 when the mold 11 has been closed, so that the face 21ᵃ of the mold member 21 lies against and extends across such open end of the cylinder. The open cylinder end 66 is connected with the mold cavity 12 by a connecting passage or gate passage 68 through which air and gases may pass from the cavity into the cylinder 62. The gate passage 68 is here shown as having been formed in the stationary mold member 21.

The gate passage 68 is located at the side of the mold cavity 12 opposite that at which the runner passage 60 communicates with the cavity and, in this case, is at the upper side of the mold cavity. Although the gate passage 68 is usually located at the opposite side of the cavity 12 from the runner passage 60, it need not always be in such an opposed relation but is so located that when molding fluid is injected into the mold cavity 12 by the injection plunger 30, the air and gas contained in the cavity and displaced by the incoming molding material will escape most readily from the cavity. Although the mold 11 is here shown as having only a single cavity 12, it is well known in the molding art that such a mold can be provided with a plurality or group of molding cavities and, if desired, the mold 11 could be provided with such a group of cavities. When the mold 11 is provided with such a plurality or group of mold cavities, one of the venting devices 10 can be provided to serve the entire group of cavities or one such venting device can be used in an associated relation to each of the mold cavities.

When the mold 11 is in its closed condition and ready for the start of a molding operation, the plunger 63 occupies an initial position relative to the mold member 22 corresponding with that shown in Fig. 3, that is to say, with the front face of the plunger lying in or adjacent the front face 22ᵃ of this mold member. The plunger 63 is freely slidable in the cylinder 62, so that air and gas displaced from the mold cavity 12 by the fluid molding material injected into the latter, will enter the cylinder and act against the exposed front face of the plunger to thereby shift the plunger into and along the cylinder to accommodate the air and gas thus displaced from the mold cavity. The portion of the cylinder 62 located on the opposite or rear side of the plunger 63 is vented to the atmosphere by means of a vent passage 69 so that air will not be trapped in such rear portion of the cylinder.

The displacement movement of the plunger 63, just described above, can be controlled by restricting the rate at which the rear end of the cylinder 62 is vented to the atmosphere through the passage 69. For this control purpose, a choke plug 70 can be provided in the rear portion of the mold member 22 and whose restricted passage or choke opening 71 is of the flow capacity selected for the vent passage 69 to appropriately control the inward displacement movement of the plunger 63. Different rates of displacement movement of the plunger 63 are obtainable by substituting different plugs 70 which have choke openings 71 of appropriately different cross-sectional rear.

As the incoming molding material enters and fills the mold cavity 12, some of this material flows into and through the gate passage 68 into the cylinder 62 and solidifies or sets in the cylinder in the form of a slug 73. The air and gas which enters the cylinder 62 becomes mixed with the molding material also entering the cylinder, so that the slug 73 will usually be of a very porous or spongy character.

As shown in the drawings, the plunger 63 is provided with a stem 75 which extends rearwardly therefrom and is slidable in a suitable passage 76 provided in the mold member 22 and in the adapter body 64. The rear end of the stem 75 projects beyond the rear face 58 of the mold member 22 and is engageable by the ejector member 51 when the latter is actuated to the position shown in Fig. 3 during the opening of the mold 11. The movement of the ejector member 51 toward the right to the position in engagement with the mold face 58, as shown in Fig. 3, causes the stem 75 to transmit a retracting movement to the plunger 63 by which the latter is returned to its initial position at the open end of the cylinder 62. It will accordingly be seen that, simultaneously with the actuation of the ejector member 51 to cause the knock-out pins 54 to eject the molded article 14 from the mold cavity 12, the plunger 63 will act as a knock-out member for ejecting the slug 73 from the open end of the cylinder 62. The plunger 63 is left standing in its initial or free position at the open end of the cylinder 62 by reason of a disengagement of the ejector plate 51 from the plunger stem 75 during the closing or reclosing of the mold 11.

When the molding material being supplied to the cavity 12 is in a heated condition and requires cooling for setting or hardening thereof, the mold members 21 and 22 are preferably provided with suitable passages 78 and 79 for the circulation of cooling medium, such as water, through these mold members. Suitable supply conduits or hoses 80 and 81 are connected with the passages 78 and 79 for supplying the cooling medium thereto. For a similar purpose, the adapter body 64 is provided with a cooling passage 82 adjacent the open end of the cylinder 62 and to which passage the cooling medium can be supplied through a suitable conduit or hose 83.

From the accompanying drawings and the foregoing detailed description it will now be readily understood that this invention provides a molding apparatus or machine having novel vent means for ridding the die cavity or cavities of air or gas which would be injurious to the articles or castings being formed and that, by the elimination of the injurious presence of such air or gas, molded articles or castings of a more uniform and homogeneous character will be consistently produced. By eliminating the air and gas from the mold cavity or cavities in the expeditious and successful manner accomplished by the venting device of this invention, the articles or castings produced will also have a more regular exterior surface contour and finish and one which will be of an attractive and unblemished appearance.

It will now also be understood that the venting device of this invention will operate smoothly and efficiently during the functioning of the molding apparatus or machine and will require no special attention on the part of the operator and is not likely to become clogged or fouled by the occurrence of carbon deposits or molding material, inasmuch as the displacement chamber of the venting device is cleared by the return movement of the plunger after each molding operation.

Although the novel molding equipment and mold venting means of this invention have been illustrated and described herein to a somewhat detailed extent, it will be understood, of course, that the invention is not to be regarded as being limited correspondingly in scope but includes all changes and modifications coming within the terms of the claim hereof.

Having described my invention, I claim:

In mold apparatus, a closable and openable mold containing a mold cavity for injection of fluid molding material thereinto, said mold comprising co-operating mold members at least one of which is movable relative to a parting plane for opening and closing said cavity, means including an ejector plate mounted upon and movable relative to said movable mold member for ejecting a molded article from said cavity, unitary means for moving said movable mold member to closed and open positions and simultaneously moving said ejector plate to idle and active positions, respectively, said movable mold member having a chamber therein provided with an open end lying substantially in said parting plane, said chamber at its open end being in communication with said cavity for receiving ventable fluid comprising air and the like displaced from said cavity by the injected molding material, a single plunger freely slidable in said chamber in a direction away from said open end in full response to the ventable fluid thereagainst, the other end of said chamber being closed except for an air-venting passage provided therein to permit such freely slidable movement of said plunger, said plunger being free for movement in the opposite direction fully to the open end of said chamber for ejecting the ventable fluid from said chamber, and actuating means operatable to move said plunger in such opposite direction upon opening of the mold, said actuating means comprising a stem projecting from said plunger and beyond said movable mold member and being disengageable and re-engageable by said ejector plate according to the position of said movable mold member, said plunger stem being engageable by said ejector plate upon opening of said movable mold member, and said ejector plate being disengageable from said plunger stem upon closing of said mold so as to leave said plunger free at the open end of said chamber preparatory to receiving ventable fluid thereinto from said cavity.

References Cited in the file of this patent

UNITED STATES PATENTS 2,233,057     Luce _____ Feb. 25, 1941

FOREIGN PATENTS 1,030,256     France _____ June 11, 1953